United States Patent [19]
Nagahara

[11] Patent Number: 5,670,718
[45] Date of Patent: Sep. 23, 1997

[54] SEMICONDUCTOR ACCELERATION DETECTING APPARATUS AND SAFETY ACCELERATION SENSOR FOR AN AIR BAG SYSTEM

[75] Inventor: Teruaki Nagahara, Tokyo, Japan

[73] Assignee: Mitsubishi Denki Kabushiki Kaisha, Tokyo, Japan

[21] Appl. No.: 602,453

[22] Filed: Feb. 16, 1996

[30] Foreign Application Priority Data

Aug. 17, 1995 [JP] Japan .................................. 7-209569

[51] Int. Cl.$^6$ ................................................ G01P 15/12
[52] U.S. Cl. ........................ 73/514.11; 280/735; 73/714
[58] Field of Search ........................... 73/514.11, 514.05, 73/514.07, 514.13, 514.33, 502, 714; 280/735

[56] References Cited

U.S. PATENT DOCUMENTS

| | | | |
|---|---|---|---|
| 3,789,949 | 2/1974 | Bortfeld et al. | 280/735 |
| 3,943,776 | 3/1976 | Schmidlin | 73/514.13 |
| 4,644,803 | 2/1987 | Ward | 73/514.07 |
| 5,145,208 | 9/1992 | Hoagland et al. | 280/734 |

*Primary Examiner*—John E. Chapman

[57] ABSTRACT

A semiconductor acceleration detecting apparatus having a cylinder fixed to a automobile, a piston having a predetermined mass, the piston being inserted in the cylinder and being slidable in an axial direction of the cylinder, a semiconductor pressure sensor disposed so as to face towards a closed space formed by an inner wall of the cylinder and an end wall of the piston, wherein the semiconductor pressure sensor converts pressure in the closed space to an electric potential difference, and an acceleration detecting apparatus including an amplifier and a comparator for detecting acceleration of the automobile in accordance with the electric potential difference outputted from the semiconductor pressure sensor.

19 Claims, 4 Drawing Sheets 5,670,718

SEMICONDUCTOR ACCELERATION DETECTING APPARATUS AND SAFETY ACCELERATION SENSOR FOR AN AIR BAG SYSTEM

FIELD OF THE INVENTION

The present invention generally relates to a semiconductor acceleration detecting apparatus. More particularly, the present invention relates to a semiconductor acceleration detecting apparatus which is usable as a safety acceleration sensor (safety G sensor) for an air bag system of an automobile, and to a safety acceleration sensor using the above-mentioned apparatus.

DESCRIPTION OF THE PRIOR ART

Air bag systems are used to improve the safety of persons in the automobile. In a typical air bag system, when a shock caused by a collision of the automobile is detected, an air bag inflater is ignited so that nitrogen gas is produced very rapidly by a gas generating agent. Then, an air bag is expanded very rapidly by the nitrogen gas.

In the air bag system, the collision of the automobile is generally detected by an acceleration detecting apparatus. In FIG. 8, there is shown an example of a conventional acceleration detecting apparatus. Thus, as shown in FIG. 8, the conventional acceleration detecting apparatus for the air bag system includes an air bag inflater 100 which is electrically connected to an electric power unit 102 through a lead wire 101. Further, a first switch 103 and a second switch 104 are interposed in series in the lead wire 101. Then, when both switches 103 and 104 are set to ON state together, electric power is fed from the electric power unit 102 to the air bag inflater 100 through the lead wire 101 so that the air bag inflater 100 is ignited.

Hereupon, the first switch 103 is set to ON state when a very rapid acceleration of the automobile larger than a predetermined maximum value is detected by an assembly including an acceleration sensor 105 and a CPU 106. On the other hand, the second switch 104 is set to ON state when a very rapid acceleration of the automobile larger than a predetermined limit value is detected by a safety G sensor 107. Namely, when both the acceleration sensor 105 and the safety G sensor 107 detect the rapid acceleration of the automobile corresponding to the shock of a collision, the air bag inflater 100 is ignited so that an air bag 200 is expanded.

The safety G sensor 107, which is one of a plurality of acceleration sensors provided in the air bag system, is provided in order to prevent an incorrect activation (expansion) of the air bag 200. In FIGS. 9A and 9B, there is shown an example of the concrete construction of the conventional safety G sensor 107. As shown in FIG. 9A, the conventional safety G sensor 107 is substantially made up of a cylinder 108 and a metal ball 109 disposed in the cylinder 108. Hereupon, the metal ball 109 is fixed to the inner surface of the cylinder 108 by a fixing member 110. In FIGS. 9A and 9B, the right side corresponds to the front side of the automobile, while the left side corresponds to the rear side of the automobile.

Thus, when the cylinder 108 is accelerated backward (leftward in FIG. 9A) with a very rapid acceleration larger than a predetermined limit ,value in accordance with a hasty speed reduction of the automobile due to a collision thereof, the forward inertia force exerted to the metal ball 109 becomes larger than the backward fixing force by the fixing member 110. Therefore, the metal ball 109 moves forward relative to the cylinder 108 as indicated by an arrow J to press (move) the second switch 104 in the forward direction. In consequence, as shown in FIG. 9B, contacts 111 in the lead wire 101 are closed by the second switch 104. Namely, the second switch 104 is set to ON state. On such a condition, if the acceleration sensor 105 (CPU 106) detects a very rapid acceleration larger than the predetermined maximum value (an acceleration level at which the air bag 200 should be expanded), the first switch 103 is also set to ON state. Consequently, electric power is fed from the electric power unit 102 to the air bag inflater 100 so that the air bag 200 is expanded. Hereupon, in general, the acceleration sensor 105 can detect the acceleration more precisely than the safety G sensor 107.

However, in such a conventional mechanical safety G sensor 107, for example, as shown in FIGS. 9A and 9B, there are problems and disadvantages as follows. Namely, because it is difficult to adjust the force for fixing the metal ball 109 to the cylinder 108 precisely with the fixing member 110, the acceleration value at which the safety G Sensor 107 should be actuated, cannot be adjusted precisely. Moreover, if the safety G sensor 107 is actuated by a cause other than a collision of the automobile, wearisome manual labor is required to return the safety G sensor 107 to an original state. Therefore, the adjustment and maintenance work of the safety G sensor 107 is very complicated.

SUMMARY OF THE INVENTION

The present invention has been developed to solve the above-mentioned conventional problems, and has an object of providing an acceleration detecting apparatus which can be used effectively as a safety G sensor for an air bag system of an automobile, the apparatus having a high acceleration detecting accuracy and a good maintenance characteristic. The present invention also has another object of providing a safety G sensor which has a high acceleration detecting accuracy and a good maintenance characteristic.

Thus, according to a first aspect of the present invention, which is developed to achieve the above-mentioned objects, there is provided a semiconductor acceleration detecting apparatus including: a cylinder fixed to a movable body, a piston having a predetermined mass, the piston being inserted in the cylinder and being slidable in an axial direction of the cylinder, a semiconductor pressure detecting sensor disposed so as to face to a closed space formed by an inner wall of the cylinder and an end wall of the piston, wherein the semiconductor pressure detecting sensor converts pressure in the closed space to electrical signals and then outputs the electrical signals, and an acceleration detector for detecting acceleration of the movable body in accordance with the electrical signals outputted from the semiconductor pressure detecting sensor.

Hereupon, the mass of the piston is adjusted to such a preferable value that sufficient pressure change is caused in the closed space by the piston when the movable body is accelerated with a very rapid acceleration due to a collision.

In this semiconductor acceleration detecting apparatus, when the movable body (consequently, the cylinder) is accelerated in an axial direction of the cylinder, the piston moves in the opposite direction thereof relative to the cylinder due to an inertia force corresponding to the acceleration and the mass of the piston so that the pressure (air pressure) in the closed space changes. Thus, the pressure change corresponding to the acceleration of the movable body is converted to electrical signals by the semiconductor pressure detecting sensor, and then the acceleration of the movable body is detected precisely in accordance with the electrical signals by the acceleration detector. Therefore, the semiconductor acceleration detecting apparatus can be used for many apparati (for example, an air bag system of an automobile) in which acceleration information is required. If the semiconductor acceleration detecting apparatus is used as a safety G sensor of an air bag system, the reliability of the air bag system is highly improved.

In the semiconductor acceleration detecting apparatus, if the acceleration of the movable body dissipates, the piston is automatically put back to its original position (standard position) by the air pressure in the closed space so that the pressure in the closed space returns to the normal pressure. Therefore, the maintenance of the semiconductor acceleration detecting apparatus is highly simplified. For example, when the semiconductor acceleration detecting apparatus is used as a safety G sensor of an air bag system, even if the safety G sensor is actuated by a cause other than a collision, the safety G sensor automatically returns to its original state.

Further, according to a second aspect of the present invention, there is provided the semiconductor acceleration detecting apparatus in which the semiconductor pressure detecting sensor includes: a semiconductor substrate having a thin diaphragm portion, a bridge circuit including gauge resistors each of which utilizes the piezoresistive effect, the gauge resistors being formed in the diaphragm portion, and wires for outward transmitting the electrical signals corresponding to the pressure in the closed space, the electrical signals being generated by the bridge circuit.

In this semiconductor acceleration detecting apparatus, because the pressure in the closed space is detected precisely by the bridge circuit including gauge resistors each of which utilizes the piezoresistive effect, the accuracy of the detected pressure value, consequently the accuracy of the detected acceleration value of the movable body is highly improved. Therefore, when the semiconductor acceleration detecting apparatus is used as a safety G sensor of an air bag system, the reliability of the air bag system is even further improved. Moreover, because the bridge circuit is formed in the thin diaphragm portion of the semiconductor substrate, the sensitivity of the bridge circuit is improved so that the accuracy of the detected acceleration value of the movable body is still further improved.

Moreover, according to a third aspect of the present invention, the semiconductor acceleration detecting apparatus further includes a piston biasing apparatus for biasing (pressing, pulling and so on) the piston at all times in such a direction that the closed space is expanded, and a one-way valve which introduces air from outside of the cylinder into the closed space when the closed space expands to prevent a decompressed state in the closed space. Hereupon, for example, a spring, a rubber or so on can be used as the piston biasing apparatus.

In this semiconductor acceleration detecting apparatus, when the movable body is accelerated in an axial direction of the cylinder, the piston moves in the opposite direction thereof relative to the cylinder. Hereupon, if the acceleration of the movable body dissipates, the piston is forcibly put back to its original position by the piston biasing apparatus. Therefore, the original position (standard position) of the piston does not change (a position slip does not occur) with time so that the accuracy of the detected acceleration value of the movable body is further improved. Hereupon, when the piston is put back to its original position by the piston biasing apparatus, atmospheric air flows into the closed space automatically through the one-way valve so that the closed space does not become decompressed.

In addition, according to a fourth aspect of the present invention, there is provided a semiconductor acceleration detecting apparatus including: a cylinder fixed to a frame of an automobile, a piston fixed to a front member which is disposed before the frame, wherein the front member moves backward due to, for example, a collision of the automobile, and the piston is inserted in the cylinder and is slidable in an axial direction of the cylinder, a semiconductor pressure detecting sensor disposed so as to face towards a closed space formed by an inner wall of the cylinder and an end wall of the piston, wherein the semiconductor pressure detecting sensor concerts pressure in the closed space to electrical signals and then outputs the electrical signals, and an acceleration detector detects acceleration of the front member in accordance with the electrical signals outputted from the semiconductor pressure detecting sensor.

In this semiconductor acceleration detecting apparatus, when the front member moves (or translates) backward relative to the frame due to a collision of the automobile etc., the piston moves backward in an axial direction of the cylinder relative to the cylinder so that the pressure in the closed space is increased. Thus, the pressure or the pressure increase is converted to an electrical signal by the semiconductor pressure detecting sensor, and then the position change (acceleration) of the front member is detected precisely in accordance with the electrical signal by the acceleration detector. Therefore, the invention precisely detects a collision of the automobile. Thus, when the semiconductor acceleration detecting apparatus is used as a safety G sensor of an air bag system, the reliability of the air bag system is highly improved.

Further, according to a fifth aspect of the present invention, in the semiconductor acceleration detecting apparatus according to the fourth aspect of the present invention, the semiconductor pressure detecting sensor includes: a semiconductor substrate having a thin diaphragm portion, a bridge circuit having gauge resistors each of which utilizes the piezoresistive effect, the gauge resistors being formed in the diaphragm portion, and wires for outward transmitting an electrical signal corresponding to the pressure in the closed space, the electrical signal being generated by the bridge circuit.

In this semiconductor acceleration detecting apparatus, fundamentally, the same operations and effects are in the fourth aspect of the present invention are achieved. Moreover, since the pressure in the closed space is detected precisely by the bridge circuit including gauge resistors each of which utilizes the piezoresistive effect, the accuracy of the detected pressure value, and consequently the accuracy of the detected position change of the front frame is highly improved. Therefore, when the semiconductor acceleration detecting apparatus is used as a safety G sensor of an air bag system, the reliability of the air bag system is still further improved. Furthermore, because the bridge circuit is formed in the thin diaphragm portion of the semiconductor substrate, the sensitivity of the bridge circuit is improved so that the accuracy of the detected position change of the automobile is even further improved.

In addition, according to a sixth aspect of the present invention, there is provided a safety acceleration sensor (safety G sensor) for an air bag system of an automobile, the sensor being composed of (or using) the semiconductor acceleration detecting apparatus according to any one of the first to fifth aspects of the present invention. In the safety acceleration sensor, because the acceleration of the automobile or the position change of the front frame is detected precisely, the reliability of the air bag system is highly improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
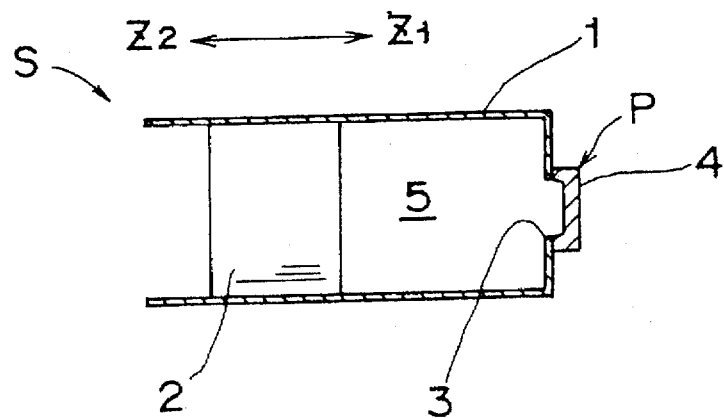
FIG. 1 is a sectional side view of a semiconductor acceleration detecting apparatus according to the first embodiment of the present invention.

Hereinafter, several preferred embodiments of the present invention will be concretely described with reference to the accompanying drawings in which like parts are designated by like reference numerals.

The First Embodiment

Figure 2A:
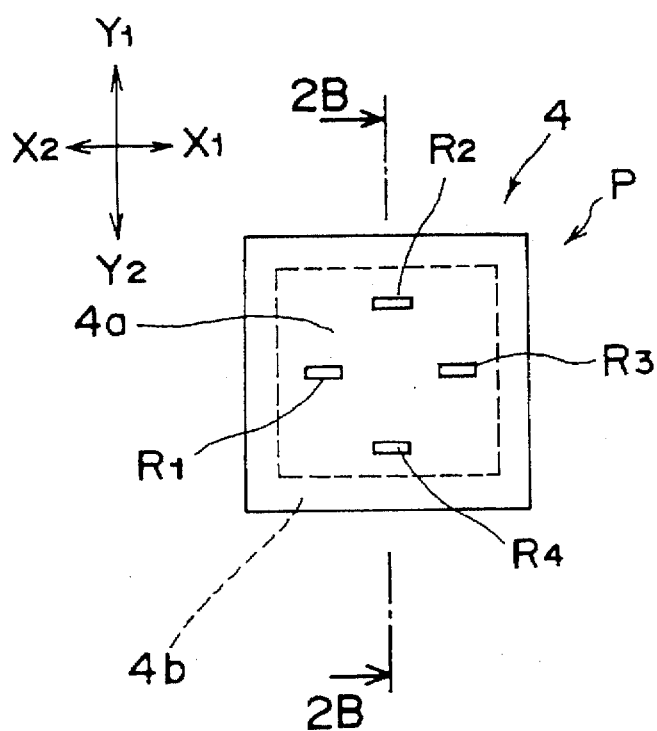
FIG. 2A is an elevation view of a semiconductor pressure sensor used in the semiconductor acceleration detecting apparatus shown in FIG. 1.
Figure 2B:
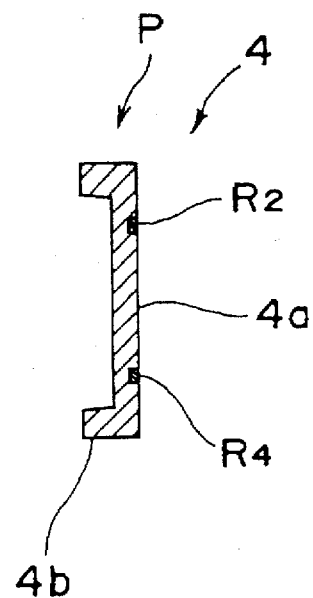
FIG. 2B is a sectional side view of the semiconductor pressure sensor shown in FIG. 2A.
Figure 3:
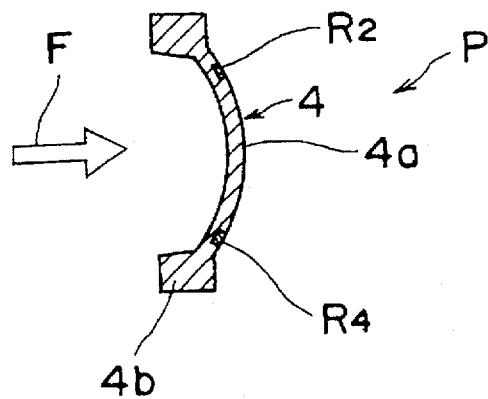
FIG. 3 is a sectional side view of the semiconductor pressure sensor shown in FIG. 2A on condition that a closed space of the semiconductor acceleration detecting apparatus is compressed.

Hereinafter, there will be described a semiconductor acceleration detecting apparatus in accordance with the first embodiment of the present invention with reference to FIGS. 1 to 4. In FIG. 1 or 3, the $Z_1$ side corresponds to the front side of an automobile, while the $Z_2$ side corresponds to the rear side of the automobile. Thus, hereinafter, for the sake of convenience, the $Z_1$ direction may be merely referred to "front" or "forward", while the $Z_2$ direction may be merely referred to "rear" or "backward".

As shown in FIG. 1, in the semiconductor acceleration detecting apparatus S which is used as a safety G sensor for an air bag system of an automobile, a cylinder 1 is fixed to the main body of the automobile (not shown), a piston 2 is inserted in the cylinder 1 so as to be slidable in the axial direction of the cylinder ($Z_1$-$Z_2$ direction), and a semiconductor pressure sensor P is disposed so as to cover a hole 3 formed in the front wall of the cylinder 1. Hereupon, a silicon substrate 4, which is one of a plurality of members constructing the semiconductor pressure sensor P, closes the hole 3 so that the closed space 5 (a closed room) is formed in the cylinder 1 by the front end surface of the piston 2, the inner circumferential surface of the cylinder 1, the rear surface of the front wall of the cylinder 1 and the rear surface of the silicon substrate 4.

In the above-mentioned construction, when the automobile collides against an object such as a telephone pole or another automobile so as to rapidly reduce its speed and produce a large acceleration, the main body of the automobile (consequently the cylinder 1) is accelerated very rapidly in the backward ($Z_2$) direction. In this condition, because the piston 2 has an inertia corresponding to its mass which causes the piston 2 to move forward ($Z_1$ direction) relative to the cylinder 1 due to a force caused by the inertia (inertial force). Hereupon, the inertial force of the piston 2 fundamentally depends on the above-mentioned acceleration and the mass of the piston 2.

Thus, as the piston 2 moves forward relative to the cylinder 1, the volume of the closed space 5 is reduced corresponding to the distance the piston 2 moves so that the air pressure in the closed space 5 is increased. Then, the air pressure value or the amount of pressure increase in the closed space 5 is detected by the semiconductor pressure sensor P. Hereupon, because the mass of the piston 2 is constant, the acceleration of the automobile or the cylinder 1 substantially depends only upon the air pressure in the closed space 5. Consequently, the acceleration of the automobile or the cylinder 1 can be detected in accordance with the pressure value or the pressure increase in the closed space 5.

Hereinafter, the concrete construction of the semiconductor pressure sensor P will be described. As shown in FIGS. 2A and 2B, the silicon substrate 4 which is one of a plurality of members constructing the semiconductor pressure sensor P, includes a thin diaphragm portion 4a which is subjected to the air pressure in the closed space 5, and a base portion 4b for attaching the semiconductor pressure sensor P to the cylinder 1, the base portion 4b being formed so as to surround the diaphragm portion 4a. Hereinafter, for the sake of convenience, the $Y_1$ and $Y_2$ directions in FIG. 2A may be referred to "upper" and "lower" respectively, and then the $X_1$ and $X_2$ directions in FIG. 2A may be referred to "right" and "left" respectively.

Thus, on the front surface (front surface in the position shown in FIG. 1) of the diaphragm portion 4a of the silicon substrate 4, there are provided first to fourth piezoresistors $R_1$–$R_4$. Each of the first to fourth piezoresistors $R_1$–$R_4$ is formed by such a general procedure that a diffusion treatment or an ion implantation treatment is performed onto the surface of the silicon substrate. The piezoresistors $R_1$–$R_4$ have a slender rectangular shape and are formed or disposed such that their longitudinal axes are oriented in right-left direction ($X_1$–$X_2$ direction). More particularly, the first piezoresistor $R_1$ is disposed at such a position that it is in the vicinity of the left end of the diaphragm portion 4a and is in the vicinity of the center of the diaphragm portion 4a in the upper-lower direction ($Y_1$–$Y_2$ direction). Then, the third piezoresistor $R_3$ is disposed at such a position that it is in the vicinity of the right end of the diaphragm portion 4a and is in the vicinity of the center of the diaphragm portion 4a in the upper-lower direction. Further, the second piezoresistor $R_2$ is disposed at such a position that it is in the vicinity of the upper end of the diaphragm portion 4a and is in the vicinity of the center of the diaphragm portion 4a in the right-left direction ($X_1$–$X_2$ direction). Then, the fourth piezoresistor $R_4$ is disposed at such a position that it is in the vicinity of the lower end of the diaphragm portion 4a and is in the vicinity of the center of the diaphragm portion 4a in the right-left direction.

Figure 4:
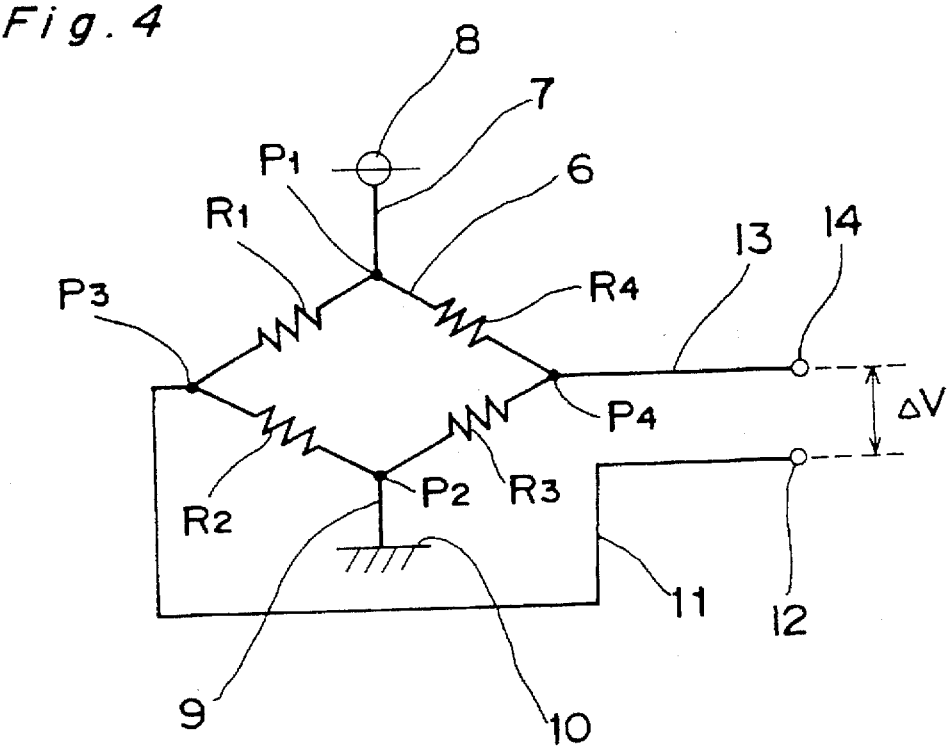
FIG. 4 is a wiring diagram of a bridge circuit constructing the semiconductor pressure detecting sensor.

Hereupon, the first to fourth piezoresistors $R_1$–$R_4$ are connected to one another in the manner of circuit shown in FIG. 4. Namely, this circuit is a bridge circuit including piezoresistors $R_1$–$R_4$, each of which utilizes semiconductor piezoresistive effect so as to convert stress caused therein to electrical signals. Because the bridge circuit is disposed on the thin diaphragm portion 4a, the sensitivity of the bridge circuit is highly elevated.

As apparent from FIG. 4, in the bridge circuit, each of the first to fourth piezoresistors $R_1$–$R_4$ are in series and are interposed in a loop lead wire 6. Thus, a point $P_1$ in the loop lead wire 6, which is between the first piezoresistor $R_1$ and the fourth piezoresistor $R_4$, is connected to an electric power unit 8 through a first lead wire 7. Further, a point $P_2$ in the loop lead wire 6, which is between the second piezoresistor $R_2$ and the third piezoresistor $R_3$, is connected to a ground 10 through a second lead wire 9.

Moreover, a point $P_3$ in the loop lead wire 6, which is between the first piezoresistor $R_1$ and the second piezoresistor $R_2$, is connected to a first output terminal 12 through a first output wire 11. Further, a point $P_4$ in the loop lead wire 6, which is between the third piezoresistor $R_3$ and the fourth piezoresistor $R_4$, is connected to a second output terminal second output wire 13. Hereupon, the electric potential difference $\Delta V$ (voltage) between the first output terminal 12 and the second output terminal 14 is detected by an electric potential difference detecting circuit (not shown).

Thus, when the cylinder 1 is accelerated backward so that the piston 2 moves forward relative to the cylinder 1 so as to increase the pressure in the closed space 5, the pressure is applied onto the rear surface of the diaphragm portion 4a of the silicon substrate in the semiconductor pressure sensor P, as shown by an arrow F in FIG. 3. Then, the diaphragm portion 4a swells in the forward direction so as to be bent, as shown in FIG. 3, so that stress is applied to piezoresistor $R_1$–$R_4$.

Due to the stress, the first piezoresistor $R_1$ and the third piezoresistor $R_3$ are extended in the longitudinal direction, namely the right-left direction ($X_1$–$X_2$ direction) so that the electric resistance of each of the resistors $R_1$, $R_3$ increases. On the other hand, the second piezoresistor $R_2$ and the fourth piezoresistor $R_4$ are extended in the width direction, namely the upper-lower direction ($Y_1$–$Y_2$ direction) so that the electric resistance of each of the resistors $R_2$, $R_4$ decreases. Consequently, an electric potential difference $\Delta V$ is generated between the first and second output terminals 12, 14 of the bridge circuit. Since the electric potential difference $\Delta V$ corresponds to the pressure in the closed space 5 with a functional relationship, the pressure in the closed space 5 is obtained in accordance with the electric potential difference $\Delta V$. Hereupon, as described above, because the pressure in the closed space 5 corresponds to the acceleration of the cylinder 1 (namely the acceleration of the automobile) with a functional relationship, the acceleration of the cylinder 1 or the automobile is detected in accordance with the electric potential difference $\Delta V$.

Thus, in the semiconductor acceleration detecting apparatus S, the acceleration of the cylinder 1 or the automobile is converted to the pressure in the closed space 5, and then the electric potential difference $\Delta V$ caused between the both output terminals 12, 14 due to the pressure is amplified by an amplifier (not shown). Further, it is judged whether the acceleration is larger than a predetermined limit value or not according to the amplified electric signals by a comparator (not shown), and then the result of the judgement is outputted. Hereat, the amplifier and the comparator can be disposed either on a main chip in which the semiconductor pressure sensor P is provided or on another chip provided outside of the main chip.

Thus, in the first embodiment of the present invention, when the automobile, consequently the cylinder 1 is accelerated backward, the piston 2 moves forward relative to the cylinder 1 due to the inertial force corresponding to the acceleration and the mass of the piston 2 so that the air pressure in the closed space 5 is increased. Further, the pressure increase corresponding to the acceleration of the automobile is converted to an electric potential difference (electric signal) by the bridge circuit of the semiconductor pressure sensor, and then the acceleration of the automobile is detected precisely in accordance with the electric potential difference by the acceleration detector including, for example, the amplifier and the comparator. Then, the acceleration is compared with the predetermined limit value. Hereupon, if the acceleration is larger than the limit value, it is judged that the automobile has collided with something. In the semiconductor acceleration detecting apparatus S, the acceleration of the automobile is detected with an extremely high accuracy which greatly improves the reliability of the air bag system in which the semiconductor acceleration detecting apparatus S is used as the safety G sensor.

Hereupon, after the semiconductor acceleration detecting apparatus S has been actuated due to a light (or not too heavy) acceleration of the automobile or the cylinder 1 (the automobile has not collided), if the acceleration of automobile dissipates, the piston 2 is automatically put back to its original position (standard position) by the air pressure in the closed space 5 so that the pressure in the closed space 5 returns to the normal pressure. Consequently, even if the semiconductor acceleration detecting apparatus S is actuated, the semiconductor acceleration detecting apparatus S automatically returns to its original state when the acceleration dissipates. Therefore, the maintenance of the semiconductor acceleration detecting apparatus S is highly simplified.

The Second Embodiment

Figure 5A:
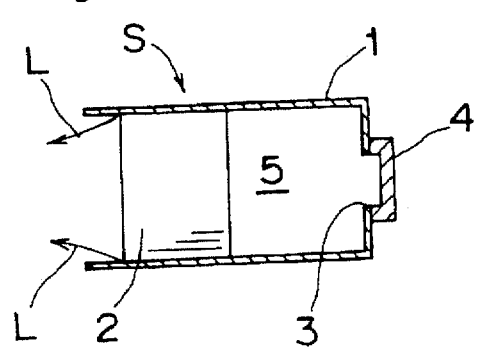
FIG. 5A is a sectional side view of the semiconductor acceleration detecting apparatus shown in FIG. 1 on condition that the standard position of a piston of the semiconductor acceleration detecting apparatus is normal.
Figure 5B:
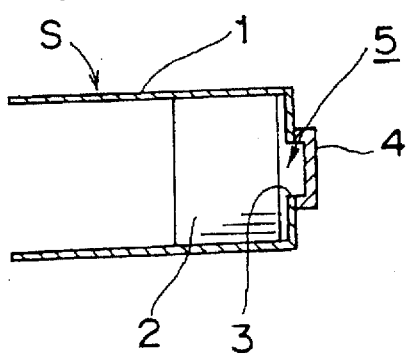
FIG. 5B is a sectional side view of the semiconductor acceleration detecting apparatus shown in FIG. 1 on condition that the standard position of the piston is slipped forward extremely.

In the first embodiment described above, because the movement of the piston 2 in the front-rear direction ($Z_1$–$Z_2$ direction) is fundamentally free, the piston 2 moves forward whenever the automobile or the cylinder 1 is backward accelerated so that the air pressure in the closed space 5 is increased every time. Thus, when the air pressure in the closed space 5 is increased in this manner, a part of the compressed air in the closed space 5 (an extremely small amount of air) leaks out through the clearance between the inner circumferential surface of the cylinder 1 and the outer circumferential surface of the piston 2, as shown by arrows L in FIG. 5A, because the seal between the cylinder 1 and the piston 2 is not perfect. Therefore, the original position (standard position) of the piston 2 slips forward little by little whenever the automobile or the cylinder 1 is accelerated backward. Thus, at last, as shown in FIG. 5B, the piston 2 reaches the vicinity of the front end of the cylinder 1, consequently it is probable that detecting the acceleration is not precise.

Figure 6:
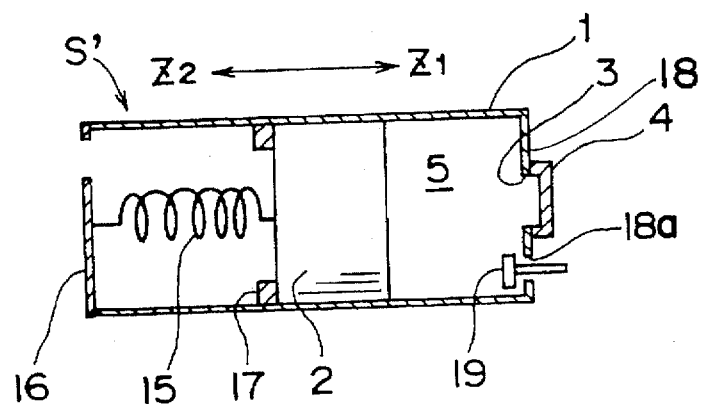
FIG. 6 is a sectional side view of a semiconductor acceleration detecting apparatus according to the second embodiment of the present invention.

Therefore, as shown in FIG. 6, in a semiconductor acceleration detecting apparatus S' according to the second embodiment of the present invention, there is provided a spring 15 which forces (pulls) the piston 2 backward with a very weak spring force at all times. Hereupon, the front end of the spring 15 is fixed to the piston 2, and the rear end of the spring 15 is fixed to a rear end wall 16 of the cylinder 1. Further, on the inner circumferential surface of the cylinder 1, there is provided a stopper 17 which prevents the piston 2 moving backward from its original position.

Also, in a front end wall 18 of the cylinder 1, there is formed a hole 18A. Further, there is provided a one-way valve 19 which opens or shuts the hole 18A in such a manner as follows. The one-way valve 19 lets the atmospheric air outside of the cylinder 1 flow into the closed space 5 when the piston 2 is put back to its original position, namely when the closed space 5 decompresses. The one-way valve 19 is provided in order to prevent the closed space 5 from becoming decompressed, namely in order to supplement the air which has leaked out through the clearance between the inner circumferential surface of the cylinder 1 and the outer circumferential surface of the piston 2 when the piston 2 is forcibly put back to its original position by the spring 15. Hereupon, when the automobile or the cylinder 1 is accelerated backward, namely the air in closed space 5 is compressed, the one-way valve 19 shuts the hole 18A so that the air pressure in the closed space 5 may increase which, in turn permits the acceleration of the automobile or the cylinder 1 to be detected precisely and without the disadvantages of the prior art.

Thus, in the semiconductor acceleration detecting apparatus S' according to the second embodiment of the present invention, fundamentally, the same operations and effects as in the above-mentioned semiconductor acceleration detecting apparatus S according to the first embodiment are achieved. Moreover, if the acceleration of the automobile or the cylinder 1 dissipates, the piston 2 is forcibly put back to its original position by the spring 15 and the closed space 5 is filled with supplemental air. Therefore, the invention avoids the disadvantage that the original position of the piston 2 slips forward little by little with time.

The Third Embodiment

Figure 7:
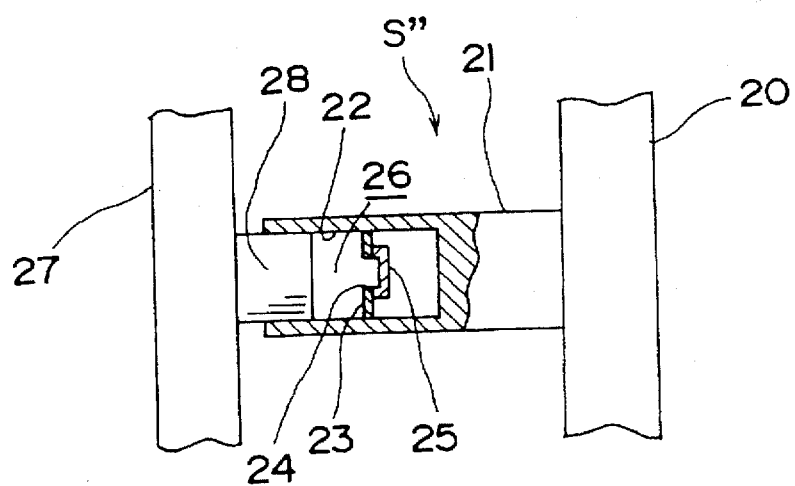
FIG. 7 is a partially sectional plane view of a semiconductor acceleration detecting apparatus according to the third embodiment of the present invention.
Figure 8:
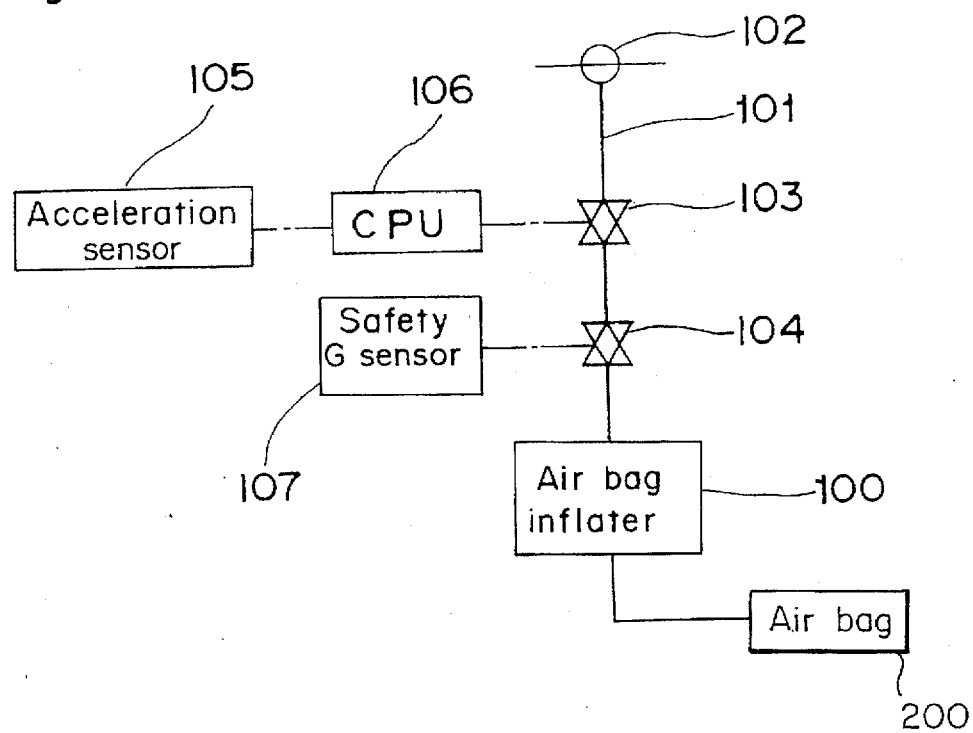
FIG. 8 is a block diagram of the conventional acceleration detecting system for an air bag system.
Figure 9A:
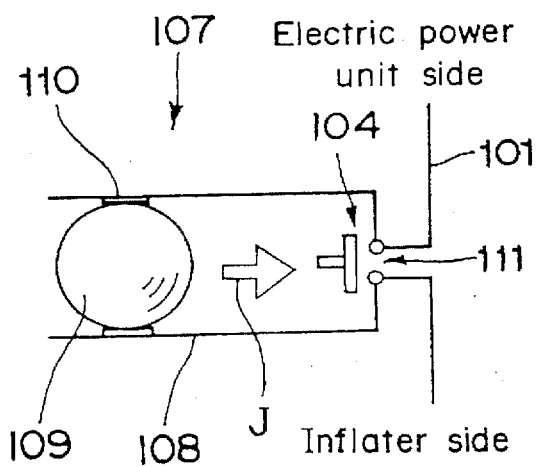
FIG. 9A is a sectional side view of the conventional safety G sensor.
Figure 9B:
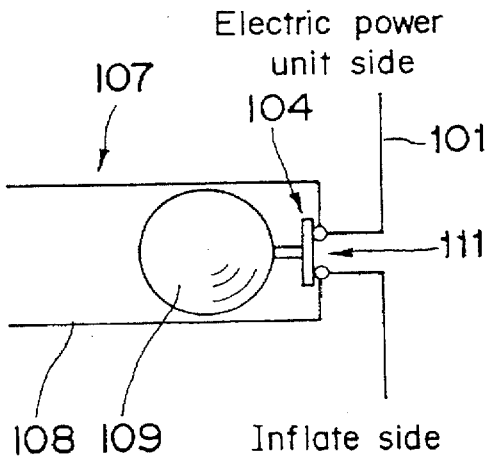
FIG. 9B is a sectional side view of the conventional safety G sensor shown in FIG. 9A under an actuated state.

Hereinafter, there will be described a semiconductor acceleration detecting apparatus in accordance with the third embodiment of the present invention with reference to FIG. 7. In FIG. 7, the left side corresponds to the front side of an automobile carrying the semiconductor acceleration detecting apparatus, while the right side corresponds to the rear side of the automobile. Thus, hereinafter, for the sake of convenience, the left direction in FIG. 7 may be referred to "front" or "forward", while the right direction in FIG. 7 may be referred to "rear" or "backward".

As shown in FIG. 7, in a semiconductor acceleration detecting apparatus S" according to the third embodiment, a rod 21 is fixed to a fram 20 extending in the width direction (or extends in the front-rear direction) of the automobile, the rod 21 extending in the front-rear direction so as to project forward. Thus, a cylinder 22 if formed in the rod 21. In the cylinder 22, there is provided a boundary wall 23 which partitions the room in the cylinder 22 into a front room and a rear room, and then a hole 24 is formed in the center portion of the boundary wall 23. Further, a semiconductor pressure sensor 25 is disposed so as to cover the hole 24. Hereupon, the semiconductor pressure sensor 25 tightly closes the hole 24 to form a seal.

Moreover, a front member 27 is disposed somewhat before the front end of the rod 21. Further, a piston 28 is fixed to the front member 27, the piston 28 extending in the front-rear direction so as to project backward. Hereupon, the piston 28 is inserted in the cylinder 22 so as to be able to axially slide in the front-rear direction. However, the movement of the piston 28 in the front-rear direction is restricted by the front member 27. Thus, in the cylinder 22, a closed space 26 is formed by the rear end surface of the piston 28, the inner circumferential surface of the cylinder 22, the front surface of the boundary wall 23 and the front surface of the semiconductor pressure sensor 25.

Hereupon, the front member 27 is such a suitable member that moves backward relative to the frame 20 when the automobile collides against a heavy body, for example, a bumper, a member of supporting a radiator etc. Still, the semiconductor pressure sensor 25 substantially has the same construction as the semiconductor pressure sensor P in the first embodiment.

Thus, in the semiconductor acceleration detecting apparatus S", when the front member 27 moves (or translates or deforms) backward relative to the frame 20 due to a collision of the automobile etc., the piston 28 moves backward relative to the cylinder 22 so that the air pressure in the closed space 26 is increased. Thus, similar to the first embodiment, the pressure increase is converted to an electrical signal by the semiconductor pressure sensor 25, and then the position change (acceleration) of the front member 27 is detected precisely in accordance with the electrical signal. Hereupon, if the movement of the front member 27 is larger than a predetermined limit value, it is judged that a collision of the automobile has occurred. In the semiconductor acceleration detecting apparatus S" according to the third embodiment, the occurrence of the collision of the automobile is detected with an extremely high accuracy. Therefore, the invention greatly improves the reliability of an air bag system in which the semiconductor acceleration detecting apparatus S" is used as the safety G sensor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A semiconductor acceleration detecting apparatus comprising:
   a cylinder fixed to a movable body;
   a piston having a predetermined mass, said piston being inserted in said cylinder and being slidable in an axial direction of said cylinder;
   a semiconductor pressure detecting sensor disposed so as to face towards a closed space formed by an inner wall of said cylinder and an end wall of said piston, wherein said semiconductor pressure detecting sensor converts pressure in the closed space to an electrical signal and then outputs the electrical signal; and acceleration detecting means for detecting acceleration of said movable body in accordance with the electrical signal outputted from said semiconductor pressure detecting sensor.

2. The semiconductor acceleration detecting apparatus recited in claim 1, wherein said semiconductor pressure detecting sensor comprises:

a semiconductor substrate having a thin diaphragm portion;

a bridge circuit including gauge resistors each of which utilizes piezoresistive effect, said gauge resistors being formed in said diaphragm portion; and wires for outwardly transmitting the electrical signal corresponding to the pressure in said closed space, the electrical signal being generated by said bridge circuit.

3. The semiconductor acceleration detecting apparatus recited in claim 1, further comprising:

a piston biasing means for biasing said piston at all times in such a direction that said closed space is expanded; and a one-way valve which introduces air from outside of said cylinder into said closed space when said closed space becomes decompressed.

4. The semiconductor acceleration detecting apparatus recited in claim 2, further comprising:

a piston biasing means for biasing said piston at all times in such a direction that said closed space is expanded; and a one-way valve which introduces air from outside of said cylinder into said closed space when said closed space becomes decompressed.

5. A semiconductor acceleration detecting apparatus comprising:

a cylinder fixed to a a first member of an automobile;

a piston fixed to a second member of the automobile, wherein the first member moves relative to the second member when a collision of the automobile occurs, said piston inserted in said cylinder and slidable in an axial direction of said cylinder;

a semiconductor pressure detecting sensor disposed so as to face towards a closed space formed by an inner wall of said cylinder and an end wall of said piston, wherein said semiconductor pressure detecting sensor converts pressure in the closed space to an electrical signal and then outputs the electrical signal; and acceleration detecting means for detecting acceleration of the first member relative to the second member in accordance with the electrical signal outputted from said semiconductor pressure detecting sensor.

6. The semiconductor acceleration detecting apparatus recited in claim 5, wherein said semiconductor pressure detecting sensor includes:

a semiconductor substrate having a thin diaphragm portion;

a bridge circuit including gauge resistors each of which utilizes piezoresistive effect, said gauge resistors being formed in said diaphragm portion; and wires for outwardly transmitting the electrical signal corresponding to the pressure in the closed space, the electrical signal being generated by said bridge circuit.

7. An air bag system of an automobile including the semiconductor detecting apparatus recited in claim 5, further comprising:

air bag means for expanding an air bag in accordance with an output of said acceleration detecting means.

8. The air bag system recited in claim 7, wherein said semiconductor pressure detecting sensor comprises:

a semiconductor substrate having a thin diaphragm portion;

a bridge circuit including gauge resistors each of which utilizes piezoresistive effect, said gauge resistors being formed in said diaphragm portion; and wires for outwardly transmitting the electrical signal corresponding to the pressure in the closed space, the electrical signal being generated by said bridge circuit.

9. The air bag system recited in claim 7, wherein the first member is a frame of the automobile.

10. The air bag system recited in claim 7, wherein the second member is front member of the automobile which is disposed in front of the first member.

11. The semiconductor acceleration detecting apparatus recited in claim 5, wherein the first member is a frame of the automobile.

12. The semiconductor acceleration detecting apparatus recited in claim 5, wherein the second member is front member of the automobile which is disposed in front of the first member.

13. A safety acceleration sensor for an air bag system of an automobile comprising:

a cylinder fixed to the automobile;

a piston having a predetermined mass, said piston being inserted in said cylinder and being slidable in an axial direction of said cylinder;

a semiconductor pressure detecting sensor disposed so as to face towards a closed space formed by an inner wall of said cylinder and an end wall of said piston, wherein said semiconductor pressure detecting sensor converts pressure in the closed space to an electrical signal and then outputs the electrical signal; and acceleration detecting means for detecting acceleration of the automobile in accordance with the electrical signal outputted from said semiconductor pressure detecting sensor.

14. The safety acceleration sensor recited in claim 13, wherein said semiconductor pressure detecting sensor includes:

a semiconductor substrate having a thin diaphragm portion;

a bridge circuit including gauge resistors each of which utilizes piezoresistive effect, said gauge resistors being formed in said diaphragm portion; and wires for outwardly transmitting the electrical signal corresponding to the pressure in the closed space, the electrical signal being generated by said bridge circuit.

15. The safety acceleration sensor recited in claim 14, further comprising:

a piston biasing means for biasing said piston at all times in such a direction that said closed space is expanded; and a one-way valve which introduces air from outside of said cylinder into the closed space when the closed space becomes decompressed.

16. The safety acceleration sensor recited in claim 13, further comprising:

a piston biasing means for biasing said piston at all times in such a direction that the closed space is expanded; and a one-way valve which introduces air from outside of said cylinder into the closed space when the closed space becomes decompressed.

17. An air bag system of an automobile including the safety acceleration sensor recited in claim 13, further comprising:

air bag means for expanding an air bag in accordance with an output of said acceleration detecting means.

18. The air bag system recited in claim 17, wherein said semiconductor pressure detecting sensor comprises:

a semiconductor substrate having a thin diaphragm portion;

a bridge circuit including gauge resistors each of which utilizes piezoresistive effect, said gauge resistors being formed in said diaphragm portion; and wires for outwardly transmitting the electrical signal corresponding to the pressure in the closed space, the electrical signal being generated by said bridge circuit.

19. A semiconductor acceleration detecting apparatus comprising:

a cylinder fixed to a movable body;

a piston having a predetermined mass, said piston being inserted in said cylinder and being slidable in an axial direction of said cylinder; and a semiconductor pressure detecting sensor disposed so as to face towards a closed space formed by an inner wall of said cylinder and an end wall of said piston, wherein said semiconductor pressure detecting sensor converts pressure in the closed space to an electrical signal representative of acceleration and then outputs the electrical signal.

* * * * *